United States Patent
Brown et al.

(10) Patent No.: US 8,099,593 B2
(45) Date of Patent: *Jan. 17, 2012

(54) SYSTEM AND METHOD FOR RETRIEVING RELATED CERTIFICATES

(75) Inventors: Michael S. Brown, Waterloo (CA); Michael K. Brown, Waterloo (CA); Herbert A. Little, Waterloo (CA); Neil P. Adams, Waterloo (CA); Michael G. Kirkup, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 184 days.

This patent is subject to a terminal disclaimer.

(21) Appl. No.: 12/632,217

(22) Filed: Dec. 7, 2009

(65) Prior Publication Data

US 2010/0082976 A1 Apr. 1, 2010

Related U.S. Application Data

(63) Continuation of application No. 10/931,108, filed on Sep. 1, 2004, now Pat. No. 7,631,183.

(51) Int. Cl.
*H04L 29/06* (2006.01)
*H04L 9/32* (2006.01)

(52) U.S. Cl. ........ 713/156; 713/155; 713/157; 713/158; 713/173

(58) Field of Classification Search .................. None
See application file for complete search history.

(56) References Cited

U.S. PATENT DOCUMENTS

| | | | |
|---|---|---|---|
| 6,092,201 A | | 7/2000 | Turnbull |
| 6,134,550 A * | | 10/2000 | Van Oorschot et al. .............. 1/1 |
| 6,233,572 B1 | | 5/2001 | Crawford et al. |
| 6,237,096 B1 * | | 5/2001 | Bisbee et al. .................. 713/178 |
| 6,377,946 B1 | | 4/2002 | Okamoto et al. |
| 6,732,144 B1 * | | 5/2004 | Kizu et al. ..................... 709/203 |
| 7,333,956 B2 * | | 2/2008 | Malcolm ........................ 705/50 |
| 7,430,663 B2 * | | 9/2008 | Brown et al. .................. 713/156 |

(Continued)

FOREIGN PATENT DOCUMENTS

HK 1087224 10/2006

(Continued)

OTHER PUBLICATIONS

Notice of Allowance. Canadian Application No. 2,516,754. Date: May 6, 2011.

(Continued)

*Primary Examiner* — Nathan Flynn
*Assistant Examiner* — Trang Doan
(74) *Attorney, Agent, or Firm* — Bereskin & Parr LLP/S.E.N.C.R.L., s.r.l.

(57) ABSTRACT

A system and method for searching and retrieving certificates, which may be used in the processing of encoded messages. In one embodiment, a certificate synchronization application is programmed to perform certificate searches by querying one or more certificate servers for all certificate authority (CA) certificates and cross-certificates on the certificate servers. In another embodiment, all certificates related to an identified certificate are retrieved from the certificate servers automatically by the certificate synchronization application, where the related certificates comprise at least one of one or more CA certificates and one or more cross-certificates. Embodiments of the invention facilitate at least partial automation of the downloading and establishment of certificate chains, thereby minimizing the need for users to manually search for individual certificates.

21 Claims, 9 Drawing Sheets

U.S. PATENT DOCUMENTS

| | | | |
|---|---|---|---|
| 7,631,183 | B2 | 12/2009 | Brown et al. |
| 2002/0004773 | A1* | 1/2002 | Xu et al. ........................ 705/36 |
| 2002/0053023 | A1* | 5/2002 | Patterson et al. ............. 713/156 |
| 2002/0062438 | A1* | 5/2002 | Asay et al. .................... 713/157 |
| 2002/0169954 | A1* | 11/2002 | Bandini et al. ................ 713/153 |
| 2002/0198745 | A1* | 12/2002 | Scheinuk et al. ................. 705/4 |
| 2003/0014365 | A1* | 1/2003 | Inada et al. ..................... 705/50 |
| 2004/0133775 | A1 | 7/2004 | Callas et al. |
| 2005/0021969 | A1 | 1/2005 | Williams et al. |
| 2005/0055372 | A1 | 3/2005 | Springer et al. |
| 2005/0102244 | A1 | 5/2005 | Dickinson et al. |
| 2005/0138388 | A1 | 6/2005 | Paganetti et al. |
| 2005/0149723 | A1 | 7/2005 | Watkins et al. |
| 2005/0169476 | A1 | 8/2005 | Little et al. |

FOREIGN PATENT DOCUMENTS

| | | |
|---|---|---|
| WO | 02/101580 | 12/2002 |
| WO | 03/079639 | 9/2003 |

OTHER PUBLICATIONS

Co-pending U.S. Appl. No. 12/194,768, "System and Method for Enabling Bulk Retrieval of Certificates", filed Aug. 20, 2008.

Co-pending U.S. Appl. No. 10/931,109, "Providing Certificate Matching in a System and Method for Searching and Retrieving Certificates", filed Sep. 1, 2004.

United States Supplemental Notice of Allowability. U.S. Appl. No. 10/931,109. Dated: Mar. 17, 2009.

Application for Patent Term Adjustment. U.S. Appl. No. 10/931,109. Dated: Feb. 4, 2009.

United States Notice of Allowance and Fee(s) Due. U.S. Appl. No. 10/931,109. Dated: Jan. 5, 2009.

Request for Continued Examination (RCE). U.S. Appl. No. 10/931,109. Dated: Dec. 15, 2008.

United States Supplemental Notice of Allowability. U.S. Appl. No. 10/931,109. Dated: Sep. 29, 2008.

United States Notice of Allowance and Fee(s) Due. U.S. Appl. No. 10/931,109. Dated: Sep. 17, 2008.

Amendment. U.S. Appl. No. 10/931,109. Dated: Jul. 18, 2008.

United States Office Action. U.S. Appl. No. 10/931,109. Dated: Apr. 22, 2008.

"Blackberry Security with the S/MIME Support Package version 1.5", Research in Motion Limited, Dec. 17, 2003, pp. 1-24.

Berbecaru, D. and Lioy, A., "Towards Simplifying PKI Implementation: Client-Server based Validation of Public Key Certificates", Proceedings of 2nd IEEE International Symposium on Signal Processing and Information Technology, Dec. 18, 2001, pp. 277-282.

Jerman-Blazic, B. et al., "A tool for support of key distribution and validity certificate check in global directory service", Computer Networks and ISDN Systems, North Holland Publishing, Amsterdam, NL, vol. 28, No. 5, Mar. 1996, pp. 709-717.

Lloyd, S. et al., "Understanding Certification Path Construction" PKI Forum, White Paper, Sep. 2002, pp. 1-14.

Batarfi, O., "ATV: An Efficient Method for Constructing a Certification Path", 18th IFIP World Computer Congress, Student Forum, Aug. 22, 2004, France, pp. 1-9.

Elley, Y. et al., "Building certification paths: forward vs. reverse", 8th Annual Symposium on Network and Distributed System Security, Feb. 2001, California, pp. 1-8.

European Communication pursuant to Article 96(2) EPC. Application No. 04104194.8-2201. Date: Jun. 7, 2006.

European Examination Report. Application No. 04104194.8. Date: Oct. 12, 2007.

Office Action. Co-pending U.S. Appl. No. 12/194,768. Date: May 6, 2011.

Response/Amendment. Co-pending U.S. Appl. No. 12/194,768. Date: Jul. 27, 2011.

\* cited by examiner

SYSTEM AND METHOD FOR RETRIEVING RELATED CERTIFICATES

CROSS REFERENCE TO RELATED APPLICATION

This application is a continuation of prior U.S. patent application Ser. No. 10/931,108, filed on Sep. 1, 2004, now issued to patent as U.S. Pat. No. 7,631,183, the entirety of which is hereby incorporated by reference.

FIELD OF THE INVENTION

The invention relates generally to the processing of messages, such as e-mail messages, and more specifically to a system and method for searching and retrieving certificates used in the processing of encoded messages.

BACKGROUND OF THE INVENTION

Electronic mail ("e-mail") messages may be encoded using one of a number of known protocols. Some of these protocols, such as Secure Multiple Internet Mail Extensions ("S/MIME") for example, rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. The authenticity of public keys used in the encoding of messages is validated using certificates. In particular, if a user of a computing device wishes to encrypt a message before the message is sent to a particular individual, the user will require a certificate for that individual. That certificate will typically comprise the public key of the individual, as well as other identification-related information.

If the requisite certificate for the intended recipient is not already stored on the user's computing device, the certificate must first be retrieved. Searching for and retrieving a certificate for a specific recipient is a process that generally involves querying a certificate server by having the user manually enter the name and/or e-mail address of the intended recipient in a search form displayed on the computing device. Certificates located in the search are then temporarily downloaded to the computing device for consideration, and a list of located certificates may be displayed to the user. Selected certificates in the list may then be manually identified by a user for storage in a non-volatile store of the computing device, for potential future use.

Many organizations set up their own certificate servers that contain all of the certificates that have been issued to people in the organization who are able to send and receive encoded messages. If, for example, an individual in one organization wishes to communicate with other individuals in another organization using encoded messages, the certificates issued to those other individuals will need to be obtained. Furthermore, additional certificates may also be needed to verify the authenticity or validity of the certificates issued to those individuals. Manually searching for certificates, as they become needed, can be inconvenient and time-consuming. Manual searching for certificates may be particularly cumbersome if the computing device on which the certificate searches are initiated is small in size (e.g. a mobile device).

SUMMARY OF THE INVENTION

Embodiments of the invention are generally directed to a system and method for searching and retrieving certificates that automates at least some of the tasks typically performed manually by users in known techniques, and which may be employed by individuals within an organization to more efficiently exchange encoded messages with other individuals in the organization that are able to do so. More specifically, embodiments of the invention may be employed to retrieve related certificates from one or more certificate servers.

In one broad aspect of the invention, there is provided a method of searching and retrieving certificates comprising the steps of: performing a search on each of one or more certificate servers, wherein at least one query is submitted to the respective certificate server to request retrieval of a plurality of certificates comprising at least one of one or more certificate authority (CA) certificates and one or more cross-certificates stored thereon, wherein the search is performed by a certificate synchronization application; retrieving the plurality of certificates for storage on a computing device of a user; and storing the plurality of certificates on the computing device.

In another broad aspect of the invention, there is provided a method of searching and retrieving certificates comprising the steps of: identifying a certificate at a computing device of a user; performing a search on one or more certificate servers, wherein at least one query is submitted to the one or more certificate servers to request retrieval of a plurality of certificates comprising at least one of one or more CA certificates and one or more cross-certificates related to the identified certificate, wherein the search is performed by a certificate synchronization application; retrieving the plurality of certificates for storage on a computing device of a user; and storing the plurality of certificates on the computing device.

BRIEF DESCRIPTION OF THE DRAWINGS

For a better understanding of embodiments of the invention, and to show more clearly how it may be carried into effect, reference will now be made, by way of example, to the accompanying drawings in which.

DETAILED DESCRIPTION OF EMBODIMENTS OF THE INVENTION

Some embodiments of the invention make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
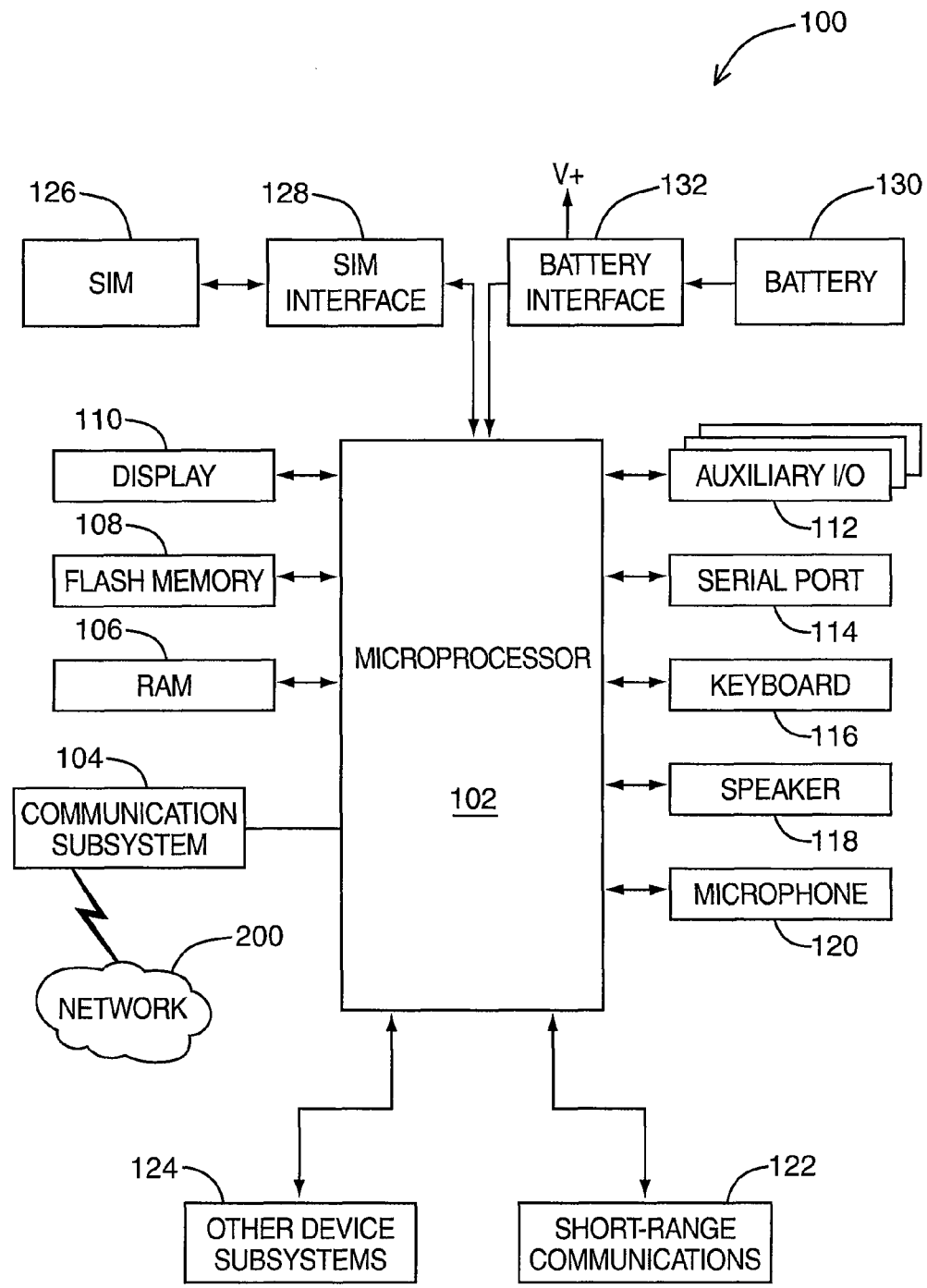
FIG. 1 is a block diagram of a mobile device in one example implementation.
Figure 2:
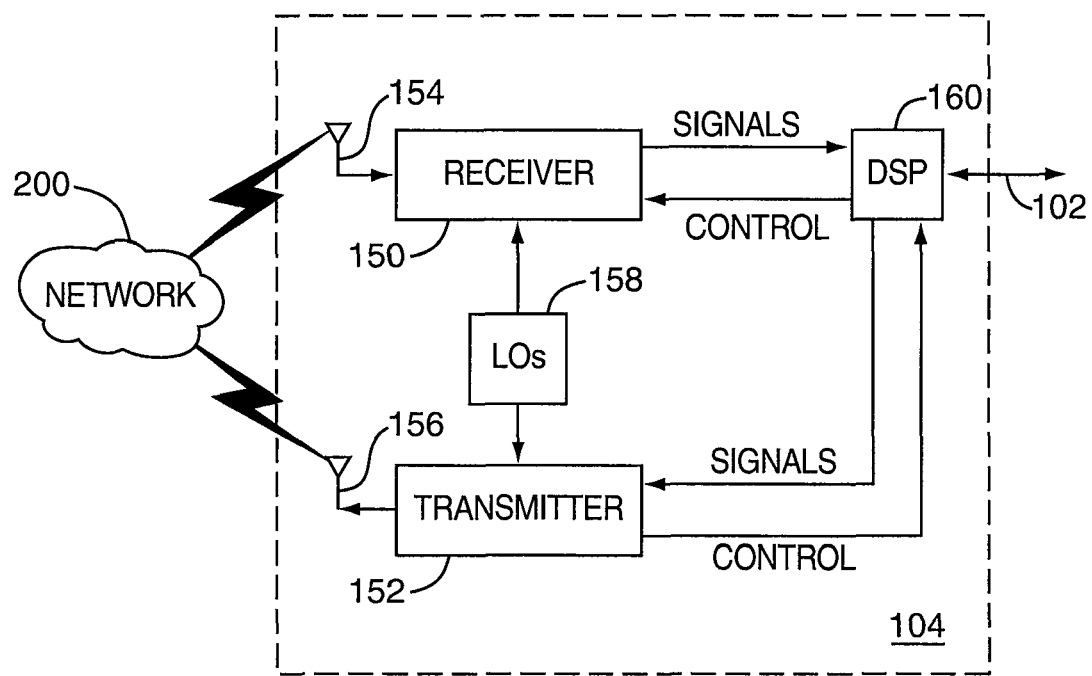
FIG. 2 is a block diagram of a communication subsystem component of the mobile device of FIG. 1.
Figure 3:
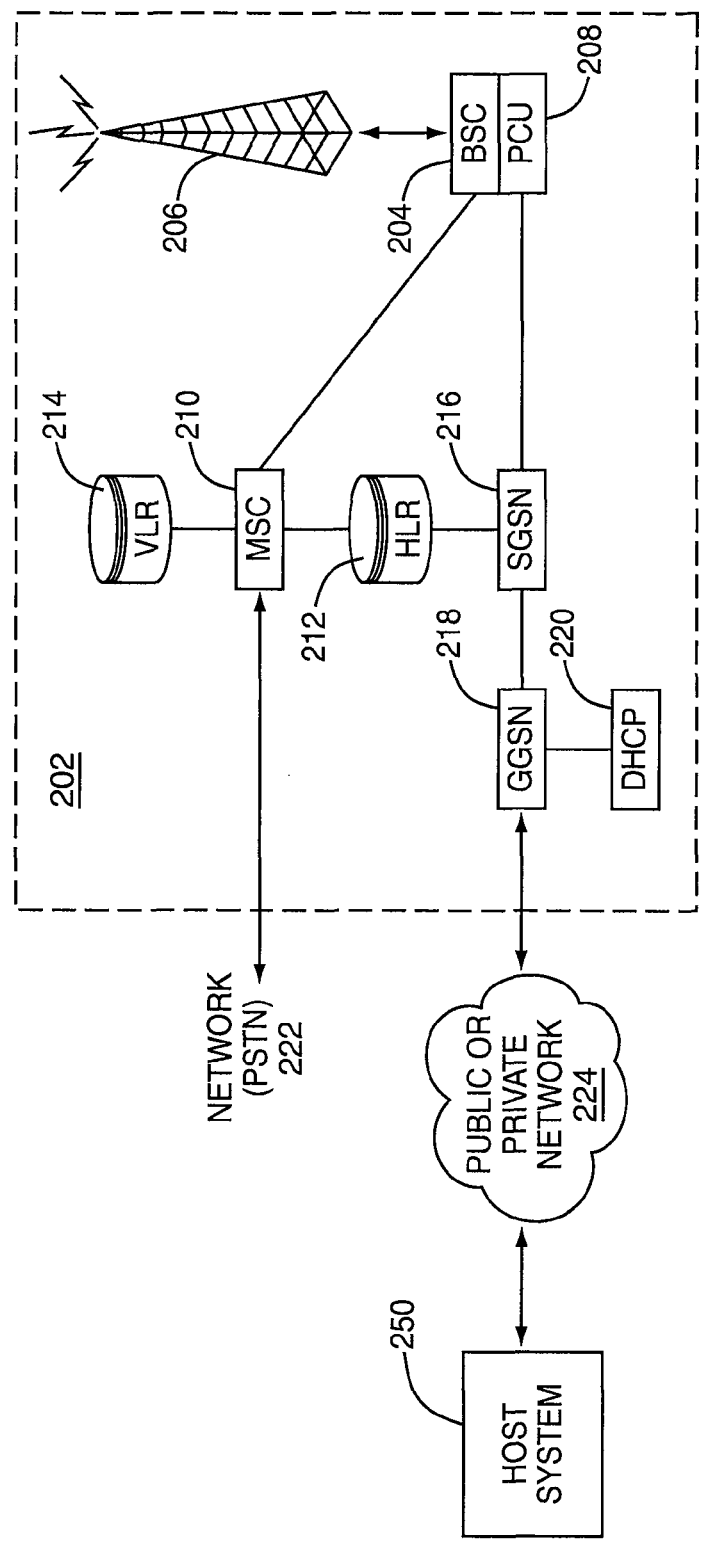
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/CPRS networks (as mentioned above), and future third-generation (3G) networks like EDGE and UMTS. Some older examples of data-centric networks include the MOBITEX™ Radio Network and the DATATAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (ND) conversion. ND conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
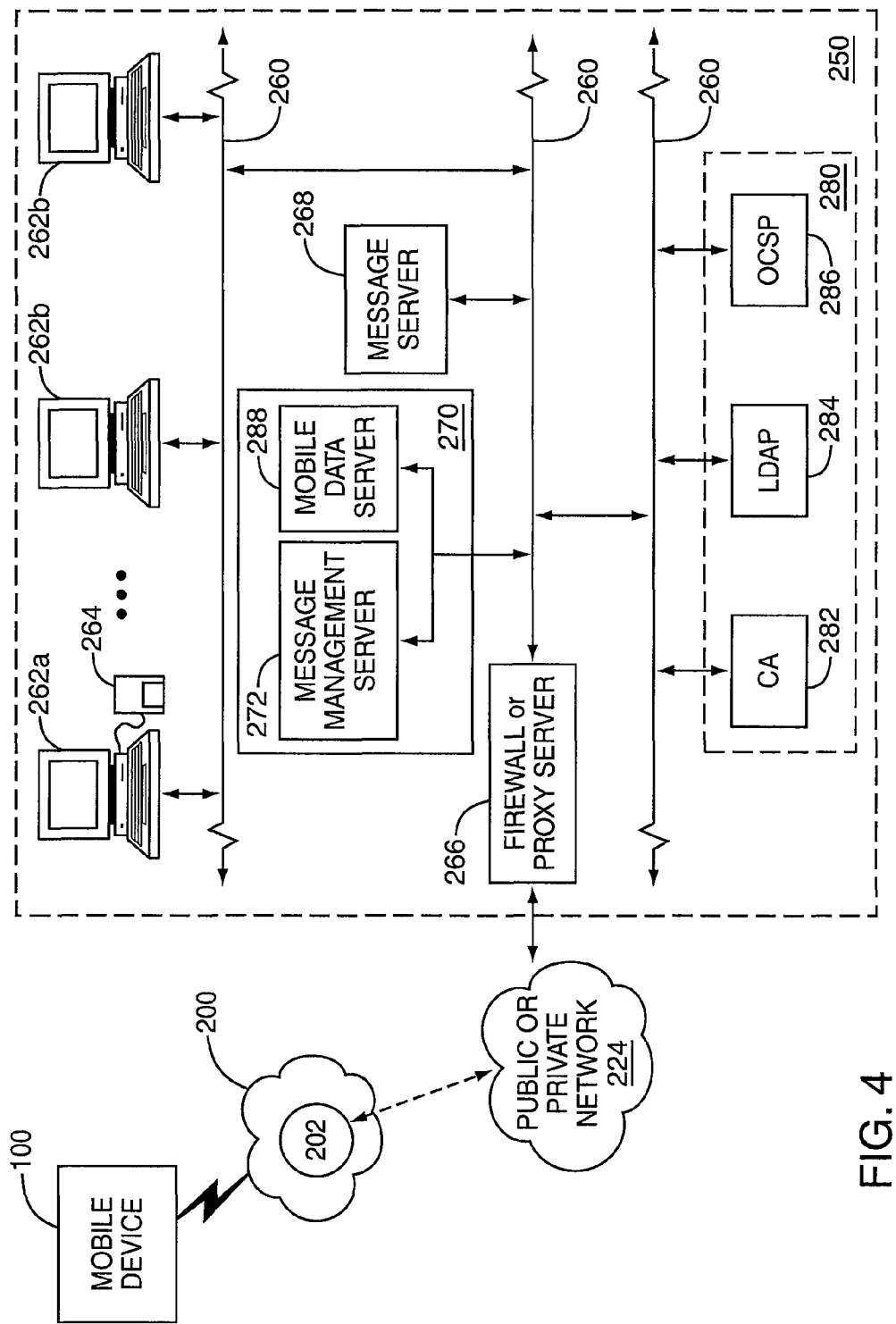
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Embodiments of the invention relate generally to the processing of messages, such as e-mail messages, and some embodiments relate generally to the communication of such messages to and from mobile device 100. Accordingly, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

Embodiments of the invention relate generally to the processing of encoded messages, such as e-mail messages that are encrypted and/or signed. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and protects data integrity and privacy from the time an originator of a message sends a message until it is decoded and read by the message recipient. Other known standards and protocols may be employed to facilitate secure message communication, such as PRETTY GOOD PRIVACY™ (PGP), Open-PGP, and others known in the art.

Secure messaging protocols such as S/MIME rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature is a digest of the message (e.g. a hash of the message) encrypted using the sender's private key, which can then be appended to the outgoing message. To verify the signature of the message when received, the recipient uses the same technique as the sender (e.g. using the same standard hash algorithm) to obtain a digest of the received message. The recipient also uses the sender's public key to decrypt the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

Figure 5:
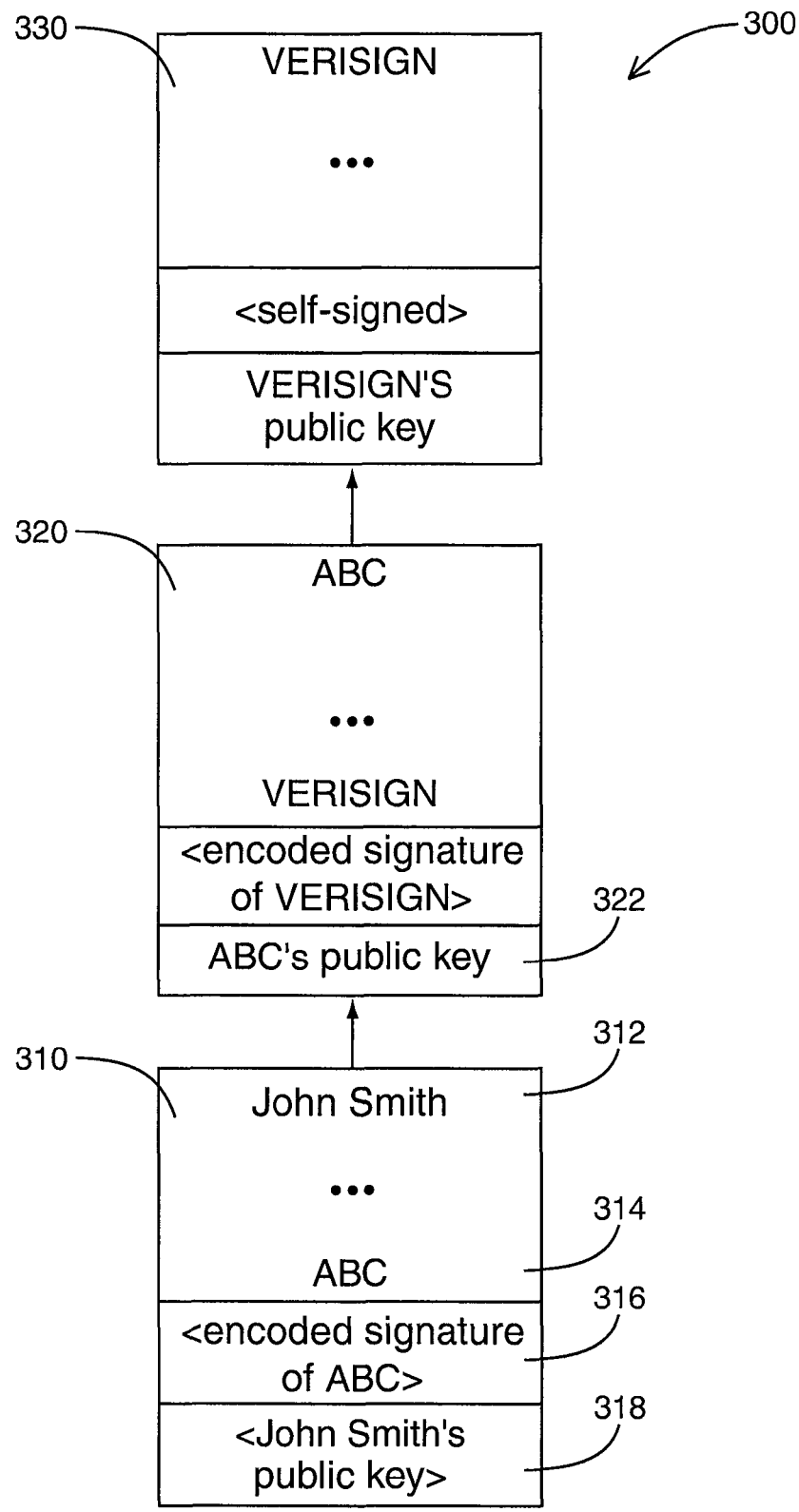
FIG. 5 is a block diagram showing an example of a certificate chain.

Consider FIG. 5, in which an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314, and includes a digital signature of the issuer 316 and the certificate holder's public key 318. Certificate 310 will also typically include other information and attributes that identify the certificate holder (e.g. e-mail address, organization name, organizational unit name, location, etc.). When the individual composes a message to be sent to a recipient, it is customary to include that individual's certificate 310 with the message.

For a public key to be trusted, its issuing organization must be trusted. The relationship between a trusted CA and a user's public key can be represented by a series of related certificates, also referred to as a certificate chain. The certificate chain can be followed to determine the validity of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. Certificate 320 may already be stored in a certificate store on the computing device, or it may need to be retrieved from a certificate source (e.g. LDAP server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required to verify the trust of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a certificate cannot be chained to a trusted certificate, the certificate may be considered to be "not trusted".

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

Standard e-mail security protocols typically facilitate secure message transmission between non-mobile computing devices (e.g. computers 262a, 262b of FIG. 4; remote desktop devices). Referring again to FIG. 4, in order that signed messages received from senders may be read from mobile device 100 and encrypted messages be sent to those senders, mobile device 100 is adapted to store certificates and associated public keys of other individuals. Certificates stored on a user's computer 262a will typically be downloaded from computer 262a to mobile device 100 through cradle 264, for example.

Certificates stored on computer 262a and downloaded to mobile device 100 are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Figure 6:
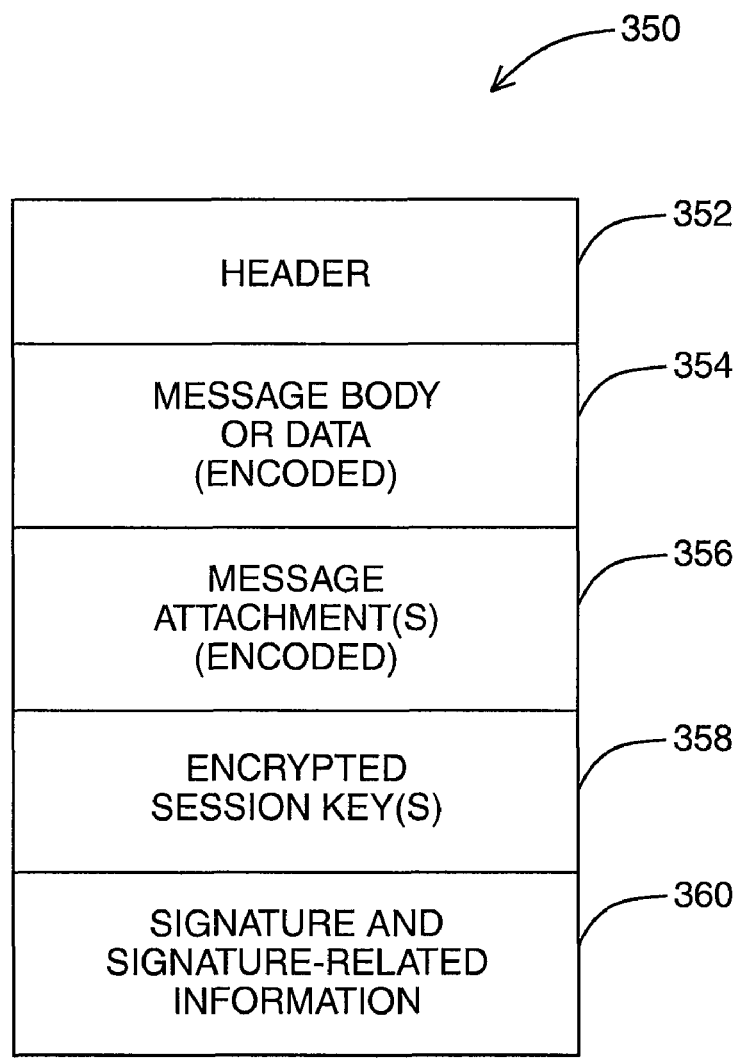
FIG. 6 is a block diagram illustrating components of an example of an encoded message.

Referring now to FIG. 6, a block diagram illustrating components of an example of an encoded message, as may be received by a message server (e.g. message server 268 of FIG. 4), is shown generally as 350. Encoded message 350 typically includes one or more of the following: a header portion 352, an encoded body portion 354, optionally one or more encoded attachments 356, one or more encrypted session keys 358, and signature and signature-related information 360. For example, header portion 352 typically includes addressing information such as "To", "From", and "CC" addresses, and may also include message length indicators, and sender encryption and signature scheme identifiers, for example. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a signature and signature-related information 360 are also included. This may include the sender's certificate, for example.

The format for an encoded message as shown in FIG. 6 is provided by way of example only, and persons skilled in the art will understand that embodiments of the invention will be applicable to encoded messages of other formats. Depending on the specific messaging scheme used, components of an encoded message may appear in a different order than shown in FIG. 6, and an encoded message may include fewer, additional, or different components, which may depend on whether the encoded message is encrypted, signed or both.

Embodiments of the invention are generally directed to a system and method for searching and retrieving certificates that automates at least some of the tasks typically performed manually by users in known techniques for searching certificates, and provide means for related certificates to be retrieved from one or more certificate servers.

For the purposes of this specification, two certificates are considered to be related to each other if they can be used to form at least a part of the same certificate chain. An example of a certificate chain was shown with reference to FIG. 5. As discussed with reference to FIG. 5, a certificate chain typically comprises root certificates, intermediate certificates, and/or end entity certificates. A certificate chain can be followed to determine the validity of a certificate, as may be formed to verify a signature on the certificate, or to check the trust status or revocation status of the certificate, for example.

Many organizations establish their own CAs, which issue certificates specifically to individuals within their own organizations. End entity certificates issued to individuals within a particular organization need not be issued by a single CA associated with the organization. An end entity certificate is often issued by one of a number of subordinate or intermediate CAs within a CA hierarchy headed by a root CA for the organization. This root CA may provide a self-signed root certificate to be used as a "trust anchor"—a starting point for the validation of certificates issued within the organization.

Figure 7A:
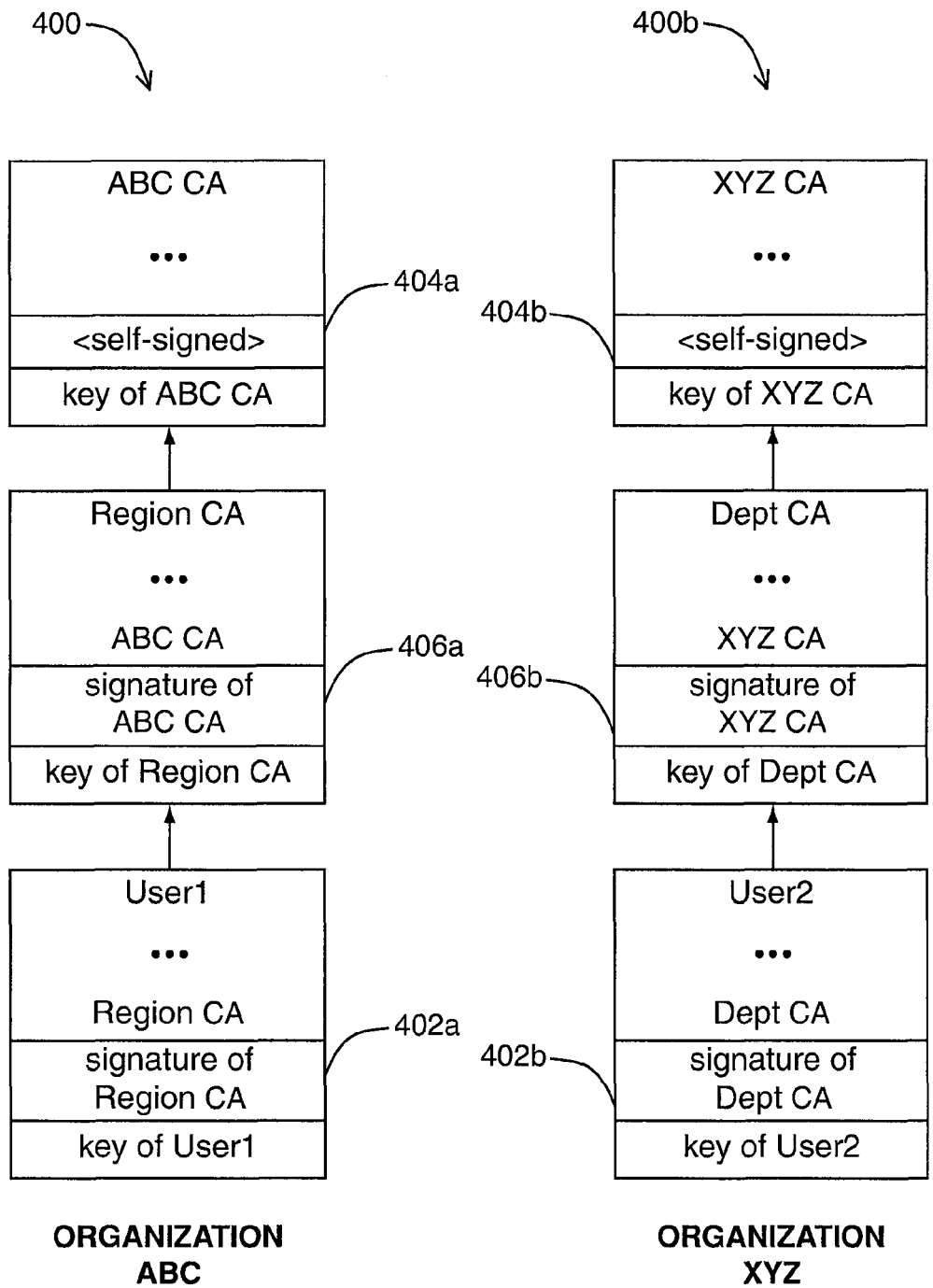
FIG. 7A is a block diagram showing two example certificate chains.

Referring to FIG. 7A, a block diagram showing two example certificate chains is shown. The two example certificate chains are illustrated generally as 400a and 400b. It will be understood by persons skilled in the art that certificate chains 400a and 400b are provided as examples. In particular, a certificate chain may comprise a fewer or a greater number of certificates than depicted in the examples shown.

Certificate chain 400a depicts an example chain of certificates formed to validate a certificate 402a issued to "user1", an individual within organization "ABC". Certificate 402a chains to a self-signed root certificate 404a, issued by a root CA of the organization and trusted by user1, via an intermediate certificate 406a issued by the root CA to an intermediate CA of the organization. The certificates issued within organization ABC may be searched and retrieved from an LDAP server maintained by the organization (e.g. LDAP server 284 of FIG. 4), for example.

Similarly, certificate chain 400b depicts an example chain of certificates formed to validate a certificate 402b issued to "user2", an individual within a different organization "XYZ". Certificate 402b chains to a self-signed root certificate 404b issued by a root CA of organization XYZ and trusted by user2, via an intermediate certificate 406b. The certificates issued within organization XYZ may be searched and retrieved from an LDAP server maintained by organization XYZ, for example.

Consider an example situation where user1 of organization ABC receives an encoded message from user2 of organization XYZ. Even if user2 has attached his certificate 402b to the message, user1 will be unable to verify the trust status of user2's certificate 402b with that certificate alone (assuming that user1 has not already stored user2's certificate 402b and marked it as trusted). If user1 does not trust certificates from organization XYZ, then user2's certificate 402b cannot be validated since it does not chain to a trusted certificate.

In order to facilitate secure communications between users of different organizations, it may be desirable to allow certificates to be used and trusted between the organizations. An authentication method known as cross-certification may be performed between two organizations, where a CA of one organization certifies a CA of the other organization.

The term cross-certification may be used to refer generally to two operations. The first operation, which is typically executed relatively infrequently, relates to the establishment of a trust relationship between two CAs (e.g. across organizations or within the same organization), through the signing of one CA's public key by another CA, in a certificate referred to as a cross-certificate. The second operation, which is typically executed relatively frequently, involves verifying a user's certificate through the formation of a certificate chain that includes at least one such cross-certificate.

Figure 7B:
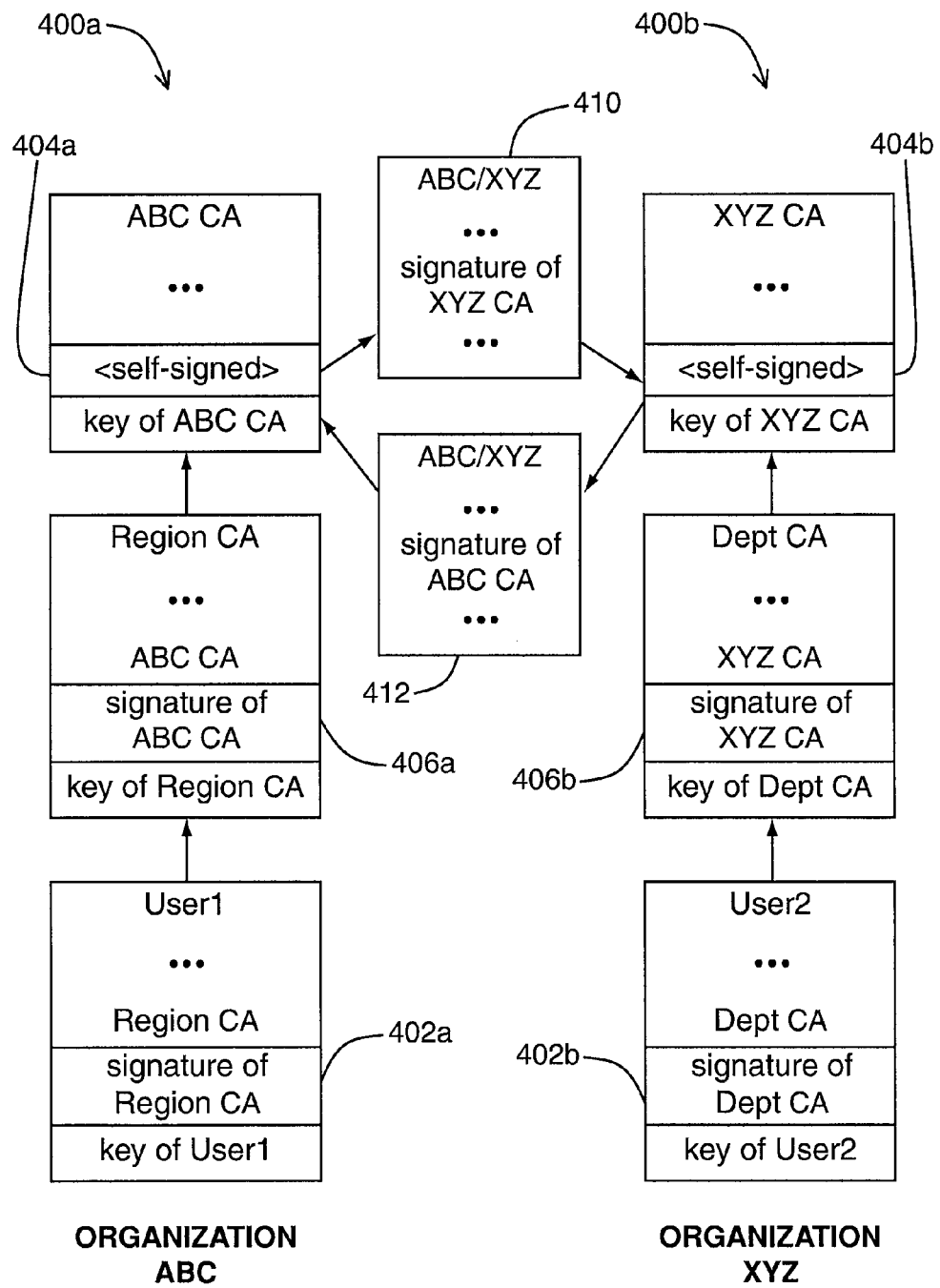
FIG. 7B is a block diagram showing cross-certificates linking the certificate chains of FIG. 7A.

Referring to FIG. 7B, a block diagram showing examples of cross-certificates linking two example certificate chains is shown. A cross-certificate 410 issued to the root CA of organization ABC by the root CA of organization XYZ is shown in this example. Similarly, a cross-certificate 412 issued to the root CA of organization XYZ by the root CA of organization ABC is shown.

The example of FIG. 7B illustrates mutual cross-certification between two root CAs. However, other cross-certification methods are possible in variant implementations. For example, cross-certificates may be issued by a subordinate CA in one organization to the root CA of another organization. As a further example, a CA of a first organization may issue a cross-certificate to a CA of a second organization, even if a cross-certificate is not issued back to the first organization by the second organization.

Furthermore, certificate usage across organizations may be restricted, as dictated by an organization's IT policy, for example. For instance, the IT policy of one organization may dictate that certificates from other organizations will be trusted only for the purpose of processing encoded e-mail messages. Also, cross-certificates may be revoked by an issuing CA of one organization to terminate trust relationships with other organizations. This can facilitate more efficient control of secure e-mail communications between individuals across different organizations.

Cross-certificates facilitate secure communications between individuals of organizations that have established a trust relationship. Consider again the situation where user1 of organization ABC receives an encoded message from user2 of organization XYZ. User1 will be able to verify the trust status of user2's certificate 402b, by retrieving certificates in a chain from user2's certificate 402b, to root certificate 404a issued by a root CA of user1's organization and trusted by user1. Specifically, as shown in the example of FIG. 7B, the chain includes ABC's root certificate 404a, cross-certificate 412, XYZ's root certificate 404b, intermediate certificate 406b, and user2's certificate 402b.

For user1 to verify the trust status of user2's certificate 402b, user1 must obtain certificate 402b. This will customarily accompany the message from user2 to user1; however, in the event that certificate 402b is not provided and is not otherwise stored on user1's computing device, it must be retrieved, from an LDAP server maintained by organization XYZ, or other certificate server, for example. Furthermore, each of the remaining certificates in the chain must also be retrieved to verify the trust status of certificate 402b. The other certificates in the chain, which in this example include a root certificate and a cross-certificate, would need to be retrieved from ABC's LDAP server, XYZ's LDAP server, or some other LDAP server accessible to user1.

Manually searching for and retrieving certificates to establish such a certificate chain can be a tedious, inconvenient task. This task can be particularly cumbersome if the search for certificates needs to be initiated by a user using a small device, such as a mobile device or other handheld device.

In some implementations of embodiments of the invention, a certificate synchronization application is provided on a user's computing device. The certificate synchronization application is programmed to allow users to initiate certificate searches of one or more certificate servers and retrieve related certificates on those certificate servers in accordance with a method of an embodiment of the invention.

In one implementation, the certificate synchronization application executes and resides on a user's desktop computer (e.g. computer 262a of FIG. 4) to which a cradle (e.g. cradle 264 of FIG. 4) for a mobile device (e.g. mobile device 100 of FIG. 4) is connected. However, in variant implementations, the certificate synchronization application may execute and reside on a desktop computer not equipped with a cradle for a mobile device, or on some other computing device. For example, the certificate synchronization application may execute and reside on a mobile device, which may have direct access to certificate servers (e.g. through mobile data server 288 of FIG. 4). By way of further example, the certificate synchronization application need not be executing on the same computing device to which certificates would typically be downloaded. For example, the certificate synchronization application may execute on a central server, such as a message management server that supports wireless devices (e.g. message management server 272 of FIG. 4) or an organization's message server (e.g. message server 268 of FIG. 4), for example. Moreover, the certificate synchronization application need not be a stand-alone application, and the functions of the certificate synchronization application described herein may be integrated with the functions of some other application, residing and executing on a computing device such as a desktop computer, a mobile device, a message management server, a message server, or some other computing device.

Figures 8A, 8B:
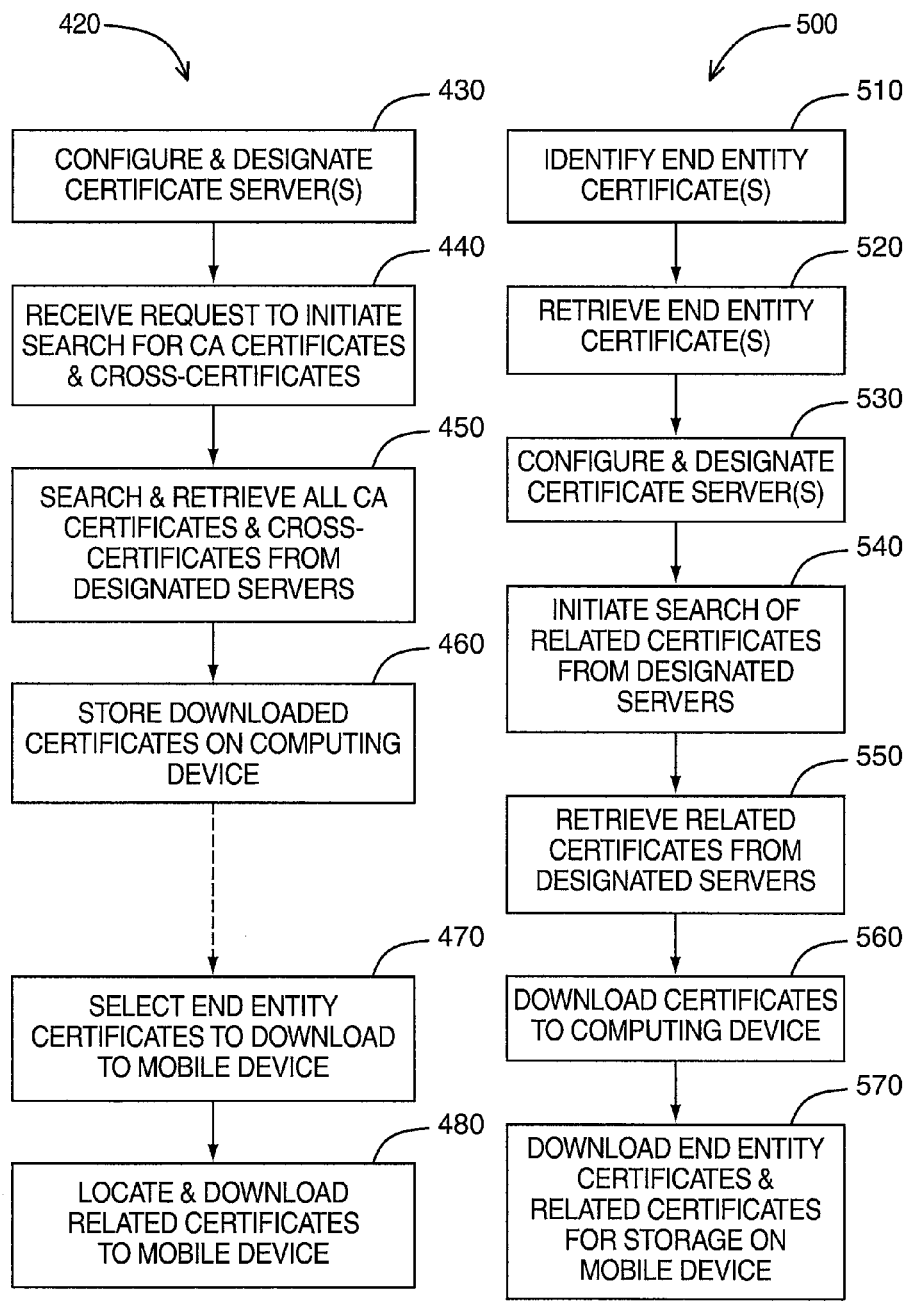
FIG. 8A is a flowchart illustrating steps in a method of searching and retrieving certificates in an embodiment of the invention.
FIG. 8B is a flowchart illustrating steps in a method of searching and retrieving certificates in another embodiment of the invention.

Referring to FIG. 8A, a flowchart illustrating steps in a method of searching and retrieving certificates in an embodiment of the invention is shown generally as 420. The method facilitates at least partial automation of searching and retrieving certificates, to minimize the need for a user to manually search for individual certificates stored on specific certificate servers.

In one embodiment of the invention, at least some of the steps of the method are performed by a certificate synchronization application that executes and resides on a desktop computer. In variant embodiments, the certificate synchronization application may be residing and executing on a computing device such as a mobile device, a message management server, a message server, or some other computing device.

At step 430, one or more certificate servers that will be used for certificate searches are configured for access at the user's computing device. In one embodiment of the invention, at least one of the configured certificate servers is a remote server (e.g. a remote LDAP server). For example, the remote server may be maintained by an organization with which a trust relationship has been established by the user's organization, where the remote server resides on a different network from the user's local network. Of the configured certificate servers, one or more certificate servers may be designated for certificate searching.

Typically, information required to configure a certificate server may include, for example, a host name, a host address or uniform resource locator (URL), a port number (e.g. for LDAP servers), a default base query, a query limit, and/or an indication of whether certificate information is to be compressed for transmission. In one implementation, such configuration information can be input by a user, and default values for certain inputs may be set in the certificate synchronization application. In other implementations, such configuration information may be defined by the certificate synchronization application, and possibly pre-defined by an IT administrator in accordance with an IT policy. Still other implementations may permit some configuration information to be input or modified by users, while not permitting other configuration information to be user-modified.

Similarly, in one implementation, the certificate synchronization application may permit users to manually designate specific certificate servers that will be queried and searched in accordance with an embodiment of the invention. In other implementations, the certificate synchronization application may automatically designate specific certificate servers to be searched, possibly as directed by an IT administrator in accordance with an IT policy. Still other implementations may permit some degree of user configuration, by allowing a user to designate specific certificate servers but only from a set defined by an IT administrator, in accordance with an IT policy, for example.

At step 440, a request is received by the certificate synchronization application to initiate a search for all CA certificates and cross-certificates in the servers designated at step 430. For example, the request may be received from the user. As a further example, in the case where the certificate synchronization application resides and executes on a computer such as a desktop computer to which a mobile device can be connected, the request may be initiated automatically when the device is connected (e.g. via cradle 264 of FIG. 4) to the computer.

At step 450, the certificate synchronization application searches for certificates by automatically querying each designated certificate server, to locate for retrieval all of the CA certificates and cross-certificates stored on each server. Queries are automatically constructed by the certificate synchronization application to locate certificates having set attributes that identify certificates as being CA certificates, which will typically include both intermediate certificates and root certificates. Similarly, queries are automatically constructed by the certificate synchronization application to locate certificates having set attributes that identify certificates as being cross-certificates. In some implementations, certain certificate servers will accept queries employing some blank or "wild card" type search indicators for use in appropriate fields that would facilitate such searching.

At step 460, the located CA certificates and cross-certificates resulting from the searches of the designated certificate servers are downloaded to the computing device, and stored in a certificate store on the computing device for future use. Duplicate certificates may be filtered out before storage in the certificate store.

Accordingly, a pool of CA certificates and cross-certificates is made available on the computing device, so that when an end entity certificate is to be validated on the computing device, there will be a greater likelihood that an entire certificate chain can be established without the need to search for additional certificates.

In one embodiment, the computing device upon which the retrieved certificates are stored is a computer to which a mobile device can be connected. In that embodiment, at a subsequent point in time, at step 470, the user may select one or more end entity certificates to be downloaded from the computing device to the mobile device. For example, the user may select an end entity certificate of an individual with whom he expects to communicate encoded messages with through his mobile device.

At step 480, the certificate synchronization application determines and locates CA certificates and/or cross-certificates in the certificate store on the computing device that are related to the end entity certificate(s) selected at step 470, and downloads the selected end entity certificate(s) and related CA certificates and/or cross-certificates to the mobile device. These downloaded certificates may then be stored in a certificate store on the mobile device.

By pre-loading CA certificates and cross-certificates on a computing device that may be related to end entity certificates that a user may wish to download to his mobile device, and subsequently downloading related pre-loaded certificates to the mobile device, the likelihood that a complete chain of certificates may be formed when it is necessary to verify a particular end entity certificate on the mobile device will be increased. As a result, the likelihood that a user of the mobile device will need to manually initiate searches for certificates (e.g. root and intermediate CA certificates and cross-certificates) to complete a certificate chain will be decreased.

Referring now to FIG. 8B, a flowchart illustrating steps in a method of searching and retrieving certificates in another embodiment of the invention is shown generally as 500. The method also facilitates at least partial automation of searching and retrieving certificates, to minimize the need for a user to manually search for individual certificates stored on specific certificate servers.

In one embodiment of the invention, at least some of the steps of the method are performed by a certificate synchronization application that executes and resides on a desktop computer. In variant embodiments, the certificate synchronization application may be residing and executing on a computing device such as a mobile device, a message management server, a message server, or some other computing device.

At step 510, one or more end entity certificates are identified, so that certificates related to each identified end entity certificate may be retrieved in subsequent steps of the method.

In one embodiment, an end entity certificate is automatically identified by the certificate synchronization application when a request is made by a user to retrieve a specific end entity certificate from a certificate server (e.g. an LDAP server), as shown at step 520. The request is initiated from the user's computing device, which may be the user's desktop computer or mobile device, for example.

In a variant embodiment, the user may already be in possession of a specific end entity certificate (in which case, the certificate may not need to be retrieved again at step 520), and the certificate may be identified through manual selection of a user wishing to download related certificates.

In a variant embodiment, an end entity certificate is automatically identified by the certificate synchronization application by selecting a certificate that is received by a user, in an incoming message, for example. In this way, the certificate synchronization application anticipates that the user may need related certificates to verify the certificate received with the incoming message. Other predictive algorithms may be applied by the certificate synchronization application to identify end entity certificates in variant embodiments.

At step 530, one or more certificate servers that will be used for certificate searches are configured and designated for access at the user's computing device. In one embodiment, at least one of the configured and designated certificate servers is a remote server, as described at step 430 of FIG. 8A. The remote server may comprise an identified end entity certificate and/or at least some of the certificates related thereto. For example, the remote server may be an LDAP server maintained by an organization to which the sender of a message received by the user belongs.

At step 540, a search for all certificates related to the identified end entity certificate is initiated by the certificate synchronization application.

At step 550, the certificate synchronization application searches for certificates by executing a search algorithm, in which the designated certificate servers are queried to locate for retrieval any CA certificates and cross-certificates specifically related to each identified end entity certificate. For example, a query may be automatically constructed by the certificate synchronization application to locate the CA certificate of the CA that issued an identified end entity certificate. Successive queries are then automatically constructed to find further certificates in the chain, preferably until a root CA certificate is obtained. The further certificates can include CA certificates and cross-certificates, for example.

At step 560, the certificates located at step 550 resulting from the searches of the designated certificate servers are downloaded to the user's computing device. In one embodiment, the downloaded certificates are stored in a certificate store on the computing device for future use. Duplicate certificates may be filtered out at this step before storage in the certificate store.

In one embodiment, the computing device is a computer, and the chain of related certificates may be downloaded to a mobile device coupled to the computer at step 570 (e.g. through a physical connection to the computer), for use on the mobile device. The certificates downloaded to the mobile device are stored in a certificate store on the mobile device.

By downloading related certificates to the mobile device, the likelihood that a user of the mobile device will need to manually initiate searches for certificates on the mobile device to complete a certificate chain will be decreased.

While the foregoing method makes reference to the identification of an end entity certificate for which related certificates are to be retrieved, in variant embodiments, the identified certificate may be an intermediate or root certificate for which related certificates are to be retrieved.

In variant embodiments of the invention, the certificate synchronization application may execute on a mobile device or a central server, for example, and is adapted to retrieve related certificates and forward them directly to a mobile device, without first downloading or storing the related certificates to a user's computer, for example.

The steps of a method of searching and retrieving certificates in embodiments of the invention may be provided as executable software instructions stored on computer-readable media.

The invention has been described with regard to a number of embodiments. However, it will be understood by persons skilled in the art that other variants and modifications may be made without departing from the scope of the invention as defined in the claims appended hereto.

The invention claimed is:

1. A method of searching and retrieving certificates for use in the processing of an encoded message, said method comprising:
    performing a search on a certificate server, wherein at least one query is submitted by an application executing on a computing device to the certificate server to request retrieval of all certificate authority certificates and cross-certificates issued by a certificate issuer of one organization that are stored on the certificate server in response to a first user request, wherein each of said certificate authority certificates is issued to a certificate issuer within said organization, and wherein each of said cross-certificates is issued to a certificate issuer of a different organization;
    retrieving the certificate authority certificates and cross-certificates and storing on the computing device the certificate authority certificates and cross-certificates;
    receiving a second user request to download a selected end entity certificate from the computing device to a mobile device;
    determining whether any certificate authority certificates or cross-certificates related to the end entity certificate are stored on the computing device; and
    in response to the second user request, downloading the selected end entity certificate to the mobile device, and further automatically downloading all certificate authority certificates and cross-certificates determined to be related to the selected end entity certificate to the mobile device.

2. The method of claim 1, wherein the certificate server comprises a server remote from both the computing device and the mobile device.

3. The method of claim 1, wherein the certificate server comprises an LDAP server.

4. The method of claim 1, further comprising requesting and retrieving, to the computing device, the selected end entity certificate from the certificate server.

5. The method of claim 1, wherein the computing device comprises a desktop computer.

6. The method of claim 1, wherein the computing device comprises a second mobile device.

7. The method of claim 1, wherein the computing device comprises a message management server or a message server.

8. A non-transitory computer-readable medium storing computer executable instructions, the instructions, which when executed by a processor of a computing device, cause the processor to perform acts of a method of searching and retrieving certificates for use in the processing of an encoded message, said acts comprising:
    performing a search on a certificate server, wherein at least one query is submitted by an application executing on the computing device to the certificate server to request retrieval of all certificate authority certificates and cross-certificates issued by a certificate issuer of one organization that are stored on the certificate server in response to a first user request, wherein each of said certificate authority certificates is issued to a certificate issuer with said organization, and wherein each of said cross-certificates is issued to a certificate issuer of a different organization;
    retrieving the certificate authority certificates and cross-certificates and storing on the computing device the certificate authority certificates and cross-certificates;
    receiving a second user request to download a selected end entity certificate from the computing device to a mobile device;

determining whether any certificate authority certificates or cross-certificates related to the end entity certificate are stored on the computing device; and in response to the second user request, downloading the selected end entity certificate to the mobile device, and further automatically downloading all certificate authority certificates and cross-certificates determined to be related to the selected end entity certificate to the mobile device.

9. The medium of claim 8, wherein the certificate server comprises a server remote from both the computing device and the mobile device.

10. The medium of claim 8, wherein the certificate server comprises an LDAP server.

11. The medium of claim 8, wherein said acts further comprise requesting and retrieving, to the computing device, the selected end entity certificate from the certificate server.

12. The medium of claim 8, wherein the computing device comprises a desktop computer.

13. The medium of claim 8, wherein the computing device comprises a second mobile device.

14. The medium of claim 8, wherein the computing device comprises a message management server or a message server.

15. A system for searching and retrieving certificates comprising a processor of a computing device configured to:

perform a search on a certificate server, wherein at least one query is submitted by an application executing on the computing device to the certificate server to request retrieval of all certificate authority certificates and cross-certificates issued by a certificate issuer of one organization that are stored on the certificate server in response to a first user request, wherein each of said certificate authority certificates is issued to a certificate issuer within said organization, and wherein each of said cross-certificates is issued to a certificate issuer of a different organization;

retrieve the certificate authority certificates and cross-certificates and store on the computing device the certificate authority certificates and cross-certificates;

receive a second user request to download a selected end entity certificate from the computing device to a mobile device;

determine whether any certificate authority certificates or cross-certificates related to the end entity certificate are stored on the computing device; and in response to the second user request, download the selected end entity certificate to the mobile device, and further automatically download all certificate authority certificates and cross-certificates determined to be related to the selected end entity certificate to the mobile device.

16. The system of claim 15, wherein the certificate server comprises a server remote from both the computing device and the mobile device.

17. The system of claim 15, wherein the certificate server comprises an LDAP server.

18. The system of claim 15, wherein the processor is further configured to request and retrieve, to the computing device, the selected end entity certificate from the certificate server.

19. The system of claim 15, wherein the computing device comprises a desktop computer.

20. The system of claim 15, wherein the computing device comprises a second mobile device.

21. The system of claim 15, wherein the computing device comprises a message management server or a message server.

* * * * *